United States Patent [19]
Hedman et al.

[11] Patent Number: 6,111,640
[45] Date of Patent: Aug. 29, 2000

[54] HYPERSPECTRAL IMAGING SPECTROMETER SPECTRAL CALIBRATION

[75] Inventors: Theodore R. Hedman, Redondo Beach; Peter J. Jarecke, Manhattan Beach; Lushalan B. Liao, San Gabriel, all of Calif.

[73] Assignee: TRW Inc., Redondo Beach, Calif.

[21] Appl. No.: 09/344,728

[22] Filed: Jun. 25, 1999

[51] Int. Cl.[7] .............................. G01J 3/00; G01N 21/93
[52] U.S. Cl. .................... 356/300; 356/326; 356/243.1
[58] Field of Search .................. 356/300, 326, 356/328, 243.1, 243.4, 243.5, 243.8

[56] References Cited

PUBLICATIONS

Sandor–Leahy, Digital Avionics Systems Conference, 1998. Proceedings., 17th DASC. The AIAA/IEEE/SAE, vol.: 2, 1998, pp. H44/1–H44/8 vol. 2 The conference was held Oct. 31–Nov. 7, 1998.
Albert Tebo, "Imaging spectrometers are at home in space, in aircraft, and on the ground—almost,"OE Reports, Jul. 1995.
Spectralon Wavelength Calibration Standards.
Stephanie Sandor–Leahy et al., "The TRWIS III hyperspectral imager: instrument performance and remote sensing applications", Proceedings of the SPIE, Jul. 1998, vol. 3438, pp. 13–22.

Primary Examiner—F. L. Evans
Attorney, Agent, or Firm—Michael S. Yatsko

[57] ABSTRACT

A method of calibrating a hyperspectral imaging spectrometer. A PTFE panel (26) having substantially 100% reflectance across a spectrum of interest is mechanically inserted into the spectrometer's field-of-view. The panel (26) is illuminated by a lamp (22, 24), such as a quartz Tungsten Halogen lamp, so that reflected radiation from the panel (26) floods the spectrometer's FOV. The image generated by the spectrometer is electronically stored. Next, the reflectance panel (26) is removed and replaced with a PTFE panel (40) that is doped with a rare earth element, such as holmium oxide, dysprosium oxide, erbium oxide or other dopants. The dopant serves the purpose of producing many distinct absorption features in the reflected spectra whose wavelengths spacings and absorption line widths are precisely known. The image obtained form the doped PTFE panel (40) is then electronically stored. The image obtained from the doped PTFE panel (40) is divided by the image obtained from the reflectance PTFE panel (26) on a pixel-by-pixel basis to obtain a measurement of the absorption spectra of the dopant. The measured spectra is compared to the known spectra as a function of spatial position across the focal plane of the spectrometer to obtain the spectral calibration. A center wavelength is then assigned to each pixel in the FPA based on the calibration.

18 Claims, 2 Drawing Sheets

HYPERSPECTRAL IMAGING SPECTROMETER SPECTRAL CALIBRATION

BACKGROUND OF THE INVENTION

1. Field of the Invention

This invention relates generally to an imaging spectrometer and, more particularly, to a technique for quickly and accurately calibrating a hyperspectral imaging spectrometer in the field using a PTFE panel having a known reflectance spectra.

2. Discussion of the Related Art

Spectral reflectance from a scene contains information that provides for the discrimination of objects or areas in the scene, and can allow detection of certain features that are not possible with other methods of remote sensing. To provide spectral reflectance imaging, hyperspectral imaging spectrometers are known that record the reflected electromagnetic spectrum from the objects in the scene as a function of the spatial position of the objects over several hundred discreet and contiguous wavelengths. The spectral dispersed images formed by the spectrometer are recorded electronically using a focal plane array (FPA). These spectrometers typically operate in the 0.4–2.5 micron wavelength range of the electromagnetic spectrum because they rely on reflected solar illumination. The imaging spectrometers are typically flown aboard aircraft to image terrestrial scenes. This technology is currently being proposed for deployment on satellites.

One known imaging spectrometer of this type is the TRW imaging spectrometer III (TRWIS III) airborne hyperspectral imager. The TRW ISIII imager includes a two-dimensional FPA having a plurality of pixels arranged in a two-dimensional array. Each pixel is a separate detector, and can be, for example, a charge-coupled device. The pixels arranged in one direction, referred to as the cross-track direction, provide spatial imaging, and the pixels arranged in the opposite direction, referred to as the spectral direction, provide spectral imaging. Each pixel in the spectral direction provides detection over a separate, contiguous wavelength band so that the entire frequency band of interest is covered by the combination of all of the pixels in that direction. An aperture slit covers a row of pixels in the cross-track direction, and as the airborne platform moves, the slit images the scene in a push-broom type manner. A grating is used to separate the light into its various wavelengths to fall on the pixels. In one design, 256 pixels are provided in the cross-track direction and 384 pixels are provided in the spectral direction. Employing several hundred pixels in the spectral direction, where each pixel images a different range of wavelengths, provides significant information from the scene.

To provide for increased device performance, two types of calibrations are performed on the spectrometer at different times during operation. The first type of calibration determines the responsivity of the pixel detectors. The responsivity calibration typically includes an in-flight calibration by recording frames of data with no light, and then recording the spectrometer's response to a reflectance standard. This procedure is generally performed once before and after each image is generated.

The second type of calibration includes providing spectral calibration of the range of wavelengths that falls on each pixel. The discrimination capability between objects in the scene provided by the image from the hyperspectral imaging spectrometers relies heavily on accurate spectral calibration as a function of field angle in the spectrometer's field-of-view (FOV). Part of the spectral calibration includes removing the effects of atmospheric absorption across the frequency spectrum. Particularly, the absorption of a water band can be rapidly varying in frequency. In order to remove the effects of the water band from the resulting data, it is necessary to know which pixels the absorption spectrum falls on so that absorption is not attributed to objects in the scene.

Spectral calibration is currently performed in the laboratory prior to data collection using spectral lamps or other illumination sources operating at discrete wavelengths. Also, spectral calibration is known to be performed in the field using a monochrometer that separates the light into a series of separate wavelength bands. The spectrometer then images the light from the monochrometer, and the center wavelength detected by each pixel in the FPA is measured. Ideally, this calibration would be performed just before each data collection in the field to account for any changes in the spectrometer's calibration over time. However, routine spectral calibrations in the field are difficult and time consuming, and the calibration apparatus can be bulky and awkward. Additionally, improvements in calibration accuracy can be made.

What is needed is an apparatus and method for the quick, accurate and repeatable spectral calibration of a hyperspectral imaging spectrometer. It is therefore an object of the present invention to provide such an apparatus and method.

SUMMARY OF THE INVENTION

In accordance with the teaching of the present invention, a method of calibrating a hyperspectral imaging spectrometer is disclosed. A substantially pure PTFE panel having a near 100% reflectance across the spectrum of interest is mechanically inserted into the spectrometer's FOV. The panel is illuminated by a lamp, such as a quartz Tungsten Halogen lamp, so that reflected radiation from the panel floods the spectrometer's FOV. The image generated by the spectrometer is electronically stored. Next, the PTFE panel is removed and replaced with another PTFE panel that is doped with a rare earth element, such as holmium oxide, dysprosium oxide, erbium oxide. The dopant serves the purpose of producing many distinct absorption features in the reflected spectra whose wavelength spacings and absorption line widths are precisely known. The image obtained from the doped PTFE panel is recorded electronically. The image obtained from the doped PTFE panel is then divided by the image obtained from the pure PTFE panel on a pixel-by-pixel basis to obtain a measurement of the absorption spectra of the dopant. The measured spectra is fit to the known spectra as a function of spatial position across the focal plane of the spectrometer to obtain the spectral calibration. A center wavelength is then assigned to each spectral pixel based on the calibration.

Additional objects, features and advantages of the present invention will become apparent from the following description and appended claims taken in conjunction with the accompanying drawings.

DETAILED DESCRIPTION OF THE PREFERRED EMBODIMENTS

The following discussion of the preferred embodiments directed to a method of calibrating a hyperspectral imaging spectrometer is merely exemplary in nature, and is in no way intended to limit the invention or its applications or uses.

Figure 1:
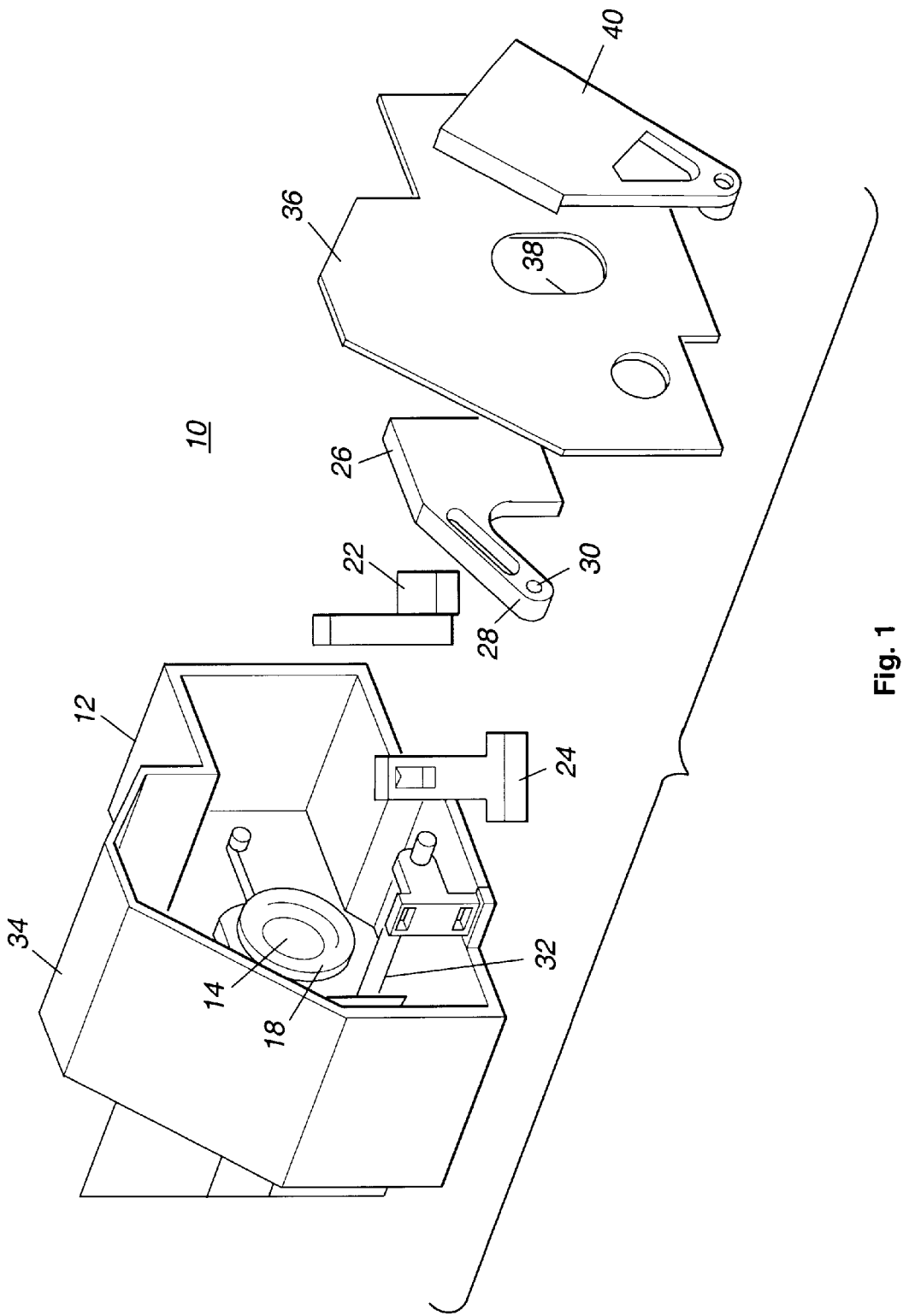
FIG. 1 is an exploded perspective view of a hyperspectral imaging spectrometer calibration apparatus, including a reflectance PTFE panel and a doped PTFE panel, according to an embodiment of the present invention.

FIG. 1 is an exploded, perspective view of a front end assembly for a hyperspectral imaging spectrometer such as the TRWIS III according to an embodiment of the present invention. The assembly 10 would be attached to the front end of the imaging spectrometer. The actual image processing equipment, including the diffraction grating and the FPA, would be in the spectrometer itself. The assembly 10 includes a housing 12 in which is mounted the various calibration components of the spectrometer that will be discussed below. The front end assembly 10 includes an entrance aperture 14 through which light enters the spectrometer to be focused on the FPA. The entrance slit (not shown) is positioned in the spectrometer behind the aperture 14. The aperture 14 includes an iris 18 for controlling the amount of light entering the spectrometer.

A first lamp 22 and a second lamp 24 are mounted within the housing 12 at a suitable location to provide illumination in front of the entrance aperture 14. The two lamps 22 and 24 are provided for redundancy purposes. In one embodiment, the lamps 22 and 24 are six watt quartz Tungsten Halogen lamps, but can be any lamp suitable for the purposes described herein.

A diffuse, reflectance panel 26 having substantially 100% reflectance, is positioned within the housing 12, and includes a mounting arm 28 having a hole 30. In one embodiment, the panel 26 is a PTFE (polytetroflouroethylene) panel. However, other suitable materials may be used for the panel 26, as long a the panel 26 is a diffuse panel having substantially 100% reflectance across the frequency band of interest with no significant absorption. The panel 26 is mounted within the housing 12 by a mounting rod 32 that extends through the hole 30. The panel 26 is selectively and mechanically rotated on the arm 28 so that it can be positioned in front of the entrance aperture 14 to reflect light from the lamps 22 and 24 onto the FPA. The panel 26 can also be rotated into an extended portion 34 of the housing 12 so that it is not in front of the aperture 14 and out of the FOV of the FPA. Rotation of the panel 26 on the rod 32 is performed external to the housing 12 by a suitable mechanical device (not shown). When the panel 26 is rotated to be in front of the entrance aperture 14, and is illuminated by one or both of the lamps 22 and 24, light reflected therefrom enters the entrance aperture 14 and is diffracted by the diffraction grating and focussed on the FPA.

A front cover 36 is mounted to a front end of the housing 12 and includes an opening 38 positioned directly in front of the entrance aperture 14. A doped panel 40 is mounted to the cover 36 outside of the housing 12, and is selectively positionable in front of the opening 38. The panel 40 is also a PTFE panel in a preferred embodiment, having a known dopant. However, the panel 40 can also be made of a different material in other embodiments consistent with the discussion herein. When the panel 26 is moved into the extended portion 34, and the panel 40 is positioned in front of the opening 38, light generated by one or both of the illumination lamps 22 and 24 is reflected off of the panel 40 and enters the entrance aperture 14. In an alternate embodiment, the panel 40 can also be positioned within the housing 12 on the rod 32, and be selectively positionable as discussed above for calibration of the spectrometer.

The PTFE panel 40 is doped with a known dopant, and is preferably a rare earth element, dopant such as holmium oxide, dysprosium oxide, or erbium oxide. By doping the panel 40 with a known dopant, the spectral content of the light reflected off of the panel 40 generates an image having distinct absorption features that includes wavelength spacings and absorption line widths that are precisely known. Thus, the doped panel 40 gives a reflected spectrum having a very accurate and known spectral reflection. Doped panels of this type are available from Labsphere for calibrating spectral instruments, and are referred to as spectralon panels.

Two types of in-flight calibration are typically required for operation of the spectrometer as discussed above. The first, or responsivity, calibration is used to determine the responsivity of the FPA as a function of received power. The responsivity calibration includes closing the entrance aperture 14 and recording frames of data with the lamps 22 and 24 turned off so that no light falls on the FPA. The entrance aperture 14 is opened and the lamps 22 and 24 are then turned on with the reflectance panel 26 in the FOV of the spectrometer, and the image is recorded. The in-flight calibration technique provides calibration throughout the entire optical system as well as the FPA response.

Figure 2:
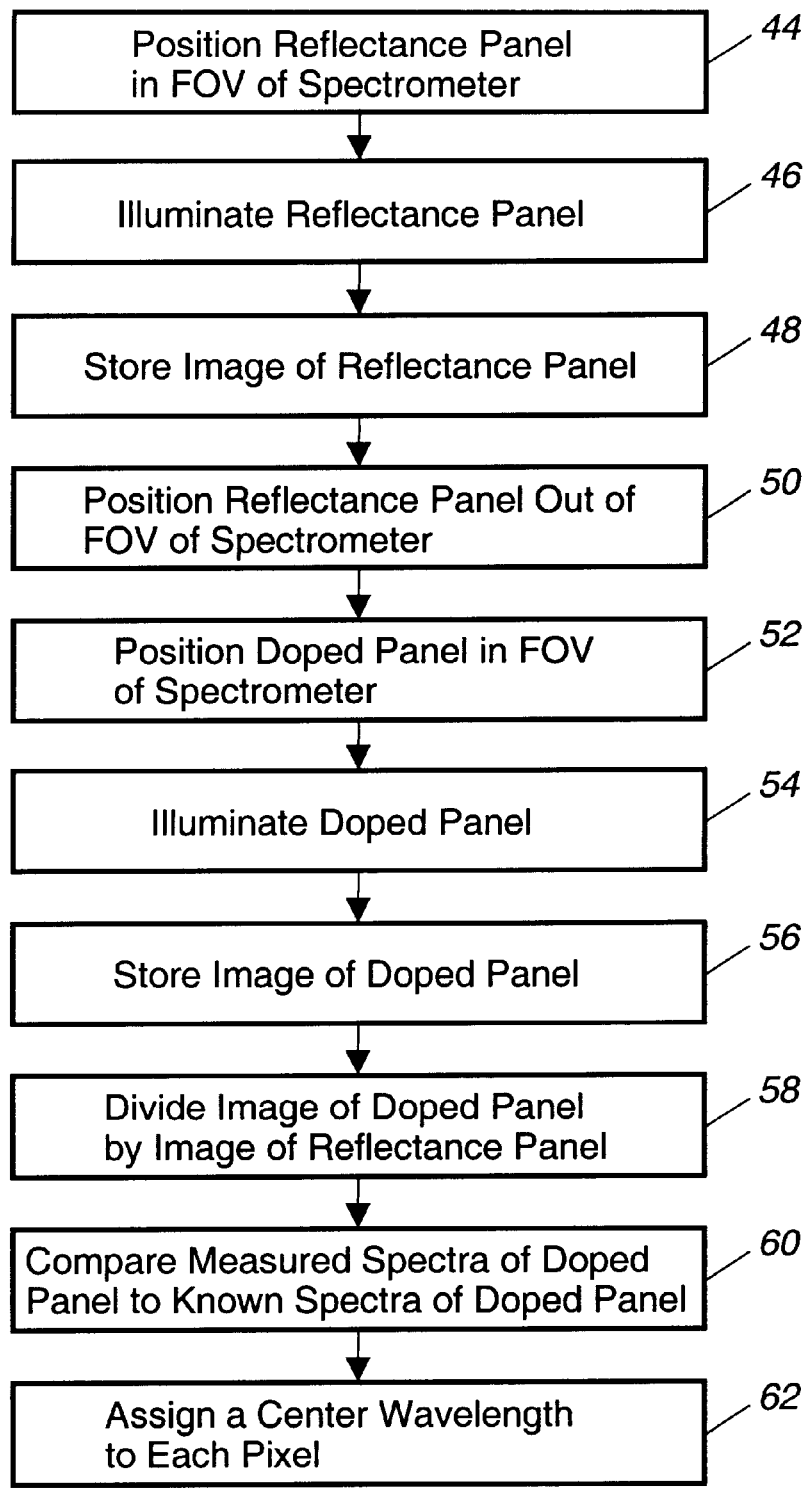
FIG. 2 is a flow diagram of a spectrometer calibration process, according to the invention.

In the second type of in-flight calibration, spectral calibration, it is necessary to specifically determine the range of wavelengths falling on each of the individual pixels in the FPA as set by the grating. This is accomplished using the combination of the reflectance panel 26 and the doped panel 40, where the spectral reflection of the doped panel 40 is known. FIG. 2 is a flow diagram 42 showing the spectral calibration of the spectrometer, according to the invention. To perform the spectral calibration, the panel 26 is positioned in front of the entrance aperture 14 at box 44, and is illuminated by one of the lamps 22 or 24 at box 46. The image generated by the FPA from the reflectance off of the panel 26 is electrically stored as voltage representations from each pixel, at box 48. The panel 26 is then rotated on the rod 32 into the extended portion 34, so that it is not positioned in front of the entrance aperture 14 at box 50.

The doped panel 40 is then mechanically positioned in front of the opening 38 and the entrance aperture 14 at box 52, and is also illuminated by one of the lamps 22 or 24 at box 54. The reflected image from the panel 40 is also stored as a function of voltage from each of the pixels at box 56. The image obtained from the doped panel 40 is divided by the image obtained from the reflectance panel 26 on a pixel-by-pixel basis to get a measurement of the absorption spectra of the dopant in the panel 40 at box 58. This measured spectra is compared to the known spectra from the panel 40 to generate a function of the spatial position across the FPA of the wavelength range for each pixel at box 60. A center wavelength is then assigned to each pixel for a particular frequency range based on the calibration at box 62.

The panels 26 and 40 may be separated from the spectrometer and be selectively positioned in front of the entrance aperture 14 for laboratory calibrations. This eliminates the panels 26 and 40 within the assembly 10 and saves space.

The spectral calibration, as discussed above, includes taking a ratio of the image obtained from the doped panel 40 and the image obtained from the reflectance panel 26, and then comparing the ratio to the known spectra of the panel 40. In one embodiment, this comparison includes performing a least squares fit to theoretical expectations by varying the dispersion relation coefficients as well as the width of the pixel spectral transfer function. The equations below provide a derivation for the least squares fit. For these equations, R(λ) is the spectral reflectance of the doped panel 40, r(λ) is the spectral reflectance of the panel 26, and L(λ) is the lamp spectral radiance curve.

$$T(\lambda - \lambda_c) = \text{sensor response centered at } \lambda_c \qquad (1)$$

$$= \frac{\exp\left(-\left(\frac{\lambda - \lambda_c}{\sigma}\right)^2\right)}{\sigma\sqrt{\pi}}$$

$\lambda_c^j$ is the center wavelength of the jth pixel $$= \lambda_c + a^* j + b^* j^2 \qquad (2)$$

The ratio of the spectra is calculated at the jth pixel to be:

$$M(j) = \frac{\int_{-\infty}^{\infty} L(\lambda) * R(\lambda) * T(\lambda - \lambda_c^j) d\lambda}{\int_{-\infty}^{\infty} L(\lambda) * r(\lambda) * T(\lambda - \lambda_c^j) d\lambda} \qquad (3)$$

Equation (3) is fairly complicated and difficult to evaluate unless the lamp radiation curve is known. It is desirable to simplify equation (3) using the following assumptions. The first assumption is that the lamp radiation curve is smooth and slowly varying within a pixel so that L(Σ) can be replaced with its weighted average:

$$\int_{-\infty}^{\infty} L(\lambda) * T(\lambda - \lambda_c^j) d\lambda \qquad (4)$$

The second assumption is that the respective reflectance curve for the reflectance panel 26 is slowly varying so that it can be replaced with its value at the pixel center. For this assumption, equation (3) can be simplified to:

$$M(j) = \frac{\int_{-\infty}^{\infty} L(\lambda) * R(\lambda) * T(\lambda - \lambda_c^j) d\lambda}{r(\lambda_c) * \int_{-\infty}^{\infty} L(\lambda) * T(\lambda - \lambda_c^j) d\lambda} \qquad (5)$$

Using the first assumption, the dependence on L(λ) can be eliminated, and the expected ratio of the spectra can be reduced to:

$$M(j) = \int_{-\infty}^{\infty} \frac{R(\lambda)}{r(\lambda_c)} * T(\lambda - \lambda_c^j) d\lambda \qquad (6)$$

The reflectance curves for the doped and undoped panels are measured in a light scattering laboratory, independent of the spectrometer under calibration. The only unknown in equation (6) is the sensor response function with parameters $\lambda_o$, a, b and σ. By performing a least squares fit of the sensor measured ratio to equation (6), the optimal estimate of these parameters is achieved. The discrepancy between the measured ratio and the prediction equation (6) is the quantity that is to be minimized by varying the parameters $\lambda_o$, a, b and σ. If S(j) is the ratio measured by the jth pixel of the spectrometer, then the sum of the squares of the error E at all of the spectral pixels is:

$$E = \sum_j (S(j) - M(j)) * (S(j) - M(j)) \qquad (7)$$

This error function can be minimized numerically or by deriving a set of four non-linear equations and solving these equations simultaneously for the parameters.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of calibrating an imaging spectrometer, said method comprising the steps of:

placing a first reflective panel in the field-of-view of the spectrometer;

illuminating the first reflective panel with radiation so that reflected radiation from the first panel illuminates the field-of-view of the spectrometer;

generating a first image of the reflected radiation from the first panel;

replacing the first reflective panel with a second reflective panel in the field-of-view of the spectrometer, said second panel including impurities defining a known spectra;

illuminating the second reflective panel with radiation so that reflected radiation from the second panel illuminates the field-of-view of the spectrometer;

generating a second image of the reflected radiation from the second panel;

comparing the second image with the first image to obtain a measured absorption spectra of the impurities; and matching the measured spectra to the known spectra as a function of spatial position across a focal plane of the spectrometer.

2. The method according to claim 1 wherein illuminating the first and second panels include illuminating PTFE panels, where the second panel is a doped PTFE panel.

3. The method according to claim 2 wherein of illuminating the second panel includes illuminating a PTFE panel doped with a dopant selected from the group consisting of the rare earth elements.

4. The method according to claim 1 including doping the second panel with a dopant selected from the group consisting of holmium oxide, dyprosium oxide and erbium oxide.

5. The method according to claim 1 including illuminating with a quartz tungsten halogen lamp.

6. The method according to claim 1 including dividing the second image with the first image.

7. The method according to claim 6 including dividing the images on a pixel-by-pixel basis.

8. The method according to claim 7 further comprising assigning a center wavelength to each pixel.

9. The method according to claim 1 further comprising storing the images electronically.

10. A method of calibrating an imaging spectrometer, said spectrometer including a focal plane array defined by a plurality of pixels, said method comprising the steps of:

mounting a first reflective PTFE panel to the spectrometer, said step of mounting the first panel including mounting the panel so that it is selectively positionable in and out of the field-of-view of the spectrometer;

illuminating the first reflective panel with radiation so that reflected radiation from the first panel illuminates the field-of-view of the spectrometer;

generating a first image of the reflected radiation from the first panel;

mounting a second reflective PTFE panel to the spectrometer, said step of mounting the second PTFE panel including mounting the second panel so that it is selectively positionable in and out of the field-of-view of the spectrometer, said second PTFE panel being doped with one or more rare earth elements and defining a known spectra;

illuminating the second PTFE panel with radiation so that reflected radiation from the second panel illuminates the field-of-view of the spectrometer;

generating a second image of the reflected radiation from the second panel;

dividing the second image by the first image to obtain a measure d absorption spectra of the dopant elements in the second panel;

comparing the measured spectra to the known spectra as a function of spatial position across the focal plane of the spectrometer; and assigning a center wavelength to each pixel in the focal plane array.

11. The method according to claim 10 including doing the second panel with a dopant selected from the group consisting of holmium oxide, dysprosium oxide, and erbium oxide.

12. The method according to claim 10 including illuminating with a quartz Tungsten Halogen lamp.

13. An imaging spectrometer calibration apparatus comprising:

a housing;

an aperture defined in the housing;

an illumination lamp attached to the housing;

a first panel attached to the housing, said first panel being selectively positionable relative to the aperture so that light reflected from the first panel enters the aperture when the first panel is in a predetermined position; and a second panel attached to the housing and being selectively positionable relative to the aperture so that light reflected from the second panel enters the aperture when the second panel is in a predetermined position, said second panel including a known dopant, said first and second panels being PTFE panels.

14. The spectrometer calibration apparatus according to claim 13 wherein the second panel is doped with a rare earth element.

15. The spectrometer calibration apparatus according to claim 14 wherein the rare earth element is selected from the group consisting of holmium oxide, dyprosium oxide and erbium oxide.

16. The spectrometer calibration apparatus according to claim 13 wherein the first panel has substantially 100% reflectance.

17. The spectrometer calibration apparatus according to claim 13 further comprising means for selectively positioning the first and second panels in the field-of-view of the spectrometer.

18. The spectrometer calibration apparatus according to claim 13 wherein the lamp is a quartz tungsten halogen lamp.

* * * * *